US012775402B2

(12) United States Patent
Pelt et al.

(10) Patent No.: US 12,775,402 B2
(45) Date of Patent: Oct. 27, 2026

(54) EFFICIENT CONFIDENTIAL COMPUTE CHECK

(71) Applicants: Advanced Micro Devices, Inc, Santa Clara, CA (US); ATI Technologies ULC, Markham (CA)

(72) Inventors: Robert Landon Pelt, Austin, TX (US); Steven Jidong Tu, Fountain Hills, AZ (US); Abin Thomas, San Jose, CA (US); Alexander Joseph Branover, Chestnut Hill, MA (US); Nippon HarshadKumar Raval, Mississauga (CA); Chetty Somu Karuppan, Coquitlam (CA)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 9 days.

(21) Appl. No.: 19/096,577

(22) Filed: Mar. 31, 2025

(65) Prior Publication Data

US 2026/0299800 A1 Oct. 1, 2026

(51) Int. Cl.
*G06F 12/00* (2006.01)
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ....... G06F 3/0659; G06F 3/061; G06F 3/0679
See application file for complete search history.

(56) References Cited

U.S. PATENT DOCUMENTS

| | | | | |
|---|---|---|---|---|
| 7,865,638 | B1 * | 1/2011 | Wyatt | G06F 12/0284 711/170 |
| 2015/0293720 | A1 * | 10/2015 | Lam | G06F 3/065 711/147 |
| 2016/0359684 | A1 * | 12/2016 | Rizqi | G06F 3/0604 |
| 2023/0305749 | A1 * | 9/2023 | Honda | G06F 3/0656 |
| 2024/0054076 | A1 * | 2/2024 | Shimada | G06F 12/10 |

FOREIGN PATENT DOCUMENTS

| | | | | |
|---|---|---|---|---|
| CA | 2933712 C | * | 4/2019 | G06F 9/4408 |
| CN | 105975407 A | * | 9/2016 | G06F 12/10 |

* cited by examiner

*Primary Examiner* — Shawn X Gu
*Assistant Examiner* — Mohammad S Hasan
(74) *Attorney, Agent, or Firm* — FIG. 1 Patents

(57) ABSTRACT

An efficient confidential compute check is described. In one or more implementations, an apparatus includes a plurality of processors each configured to execute memory translations of at least one client that map client virtual memory to corresponding allocations of a physical memory shared among the plurality of processors. The apparatus also includes a security circuit configured to authorize client access to allocated regions of the physical memory based on whether an intercepted memory translation corresponds to an authorized client.

20 Claims, 6 Drawing Sheets

EFFICIENT CONFIDENTIAL COMPUTE CHECK

BACKGROUND

A conventional system includes a host processor and one or more accelerator processors that offload or perform specialized tasks. Accelerator clients operate on accelerator processors in conjunction with host clients executing on the host processor, including by sharing access to physical memory. While conventional memory controls prevent unauthorized host clients from accessing memory allocated to other host clients, there may be little to no protection against unauthorized access by external clients (e.g., accelerator clients), which poses significant risks to operational security and integrity.

BRIEF DESCRIPTION OF THE DRAWINGS

The detailed description is described with reference to the accompanying figures.

DETAILED DESCRIPTION

Figure 1:
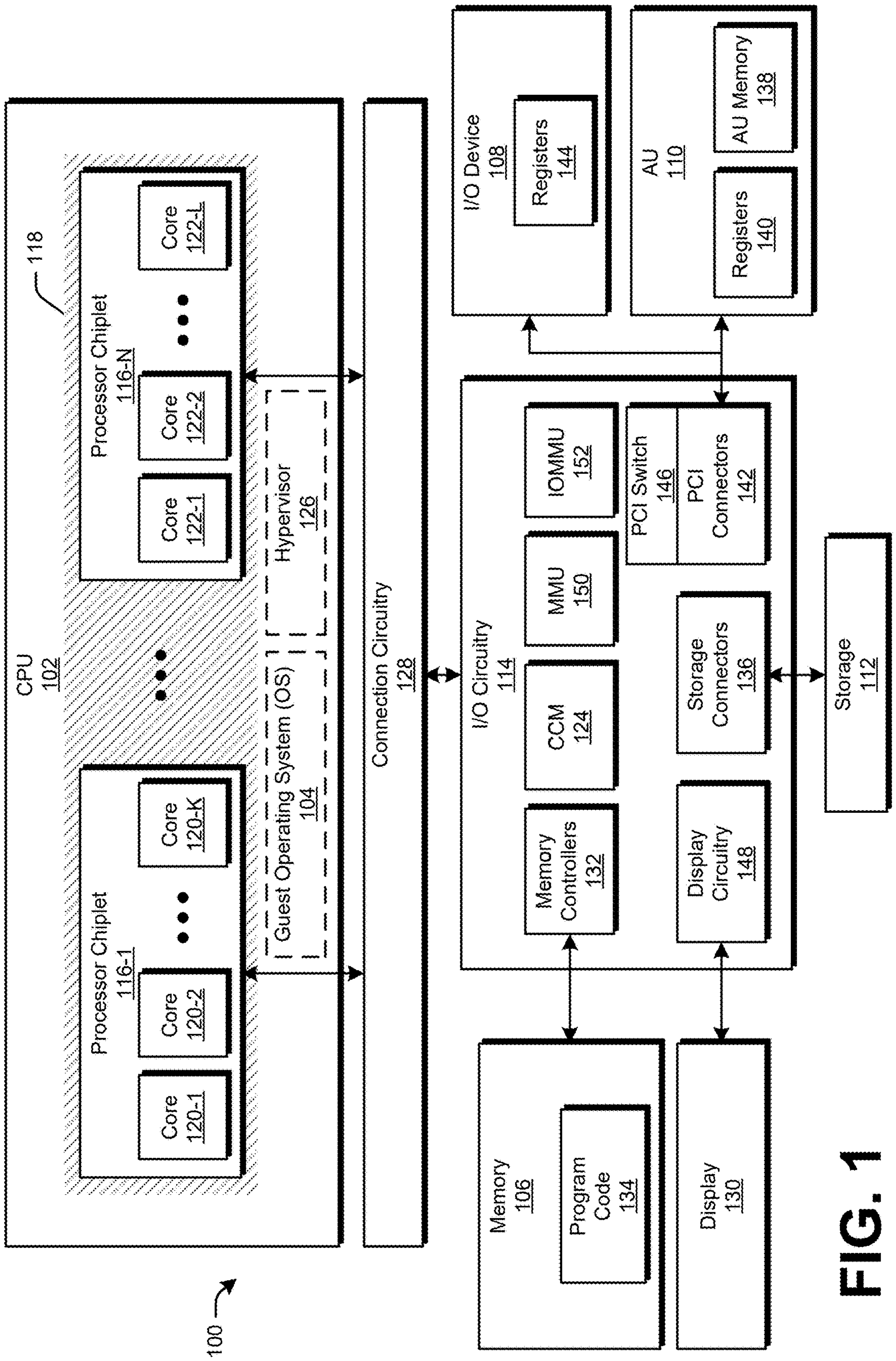
FIG. 1 is a block diagram of a processing system configured to execute one or more applications, in accordance with one or more implementations.

A conventional system consists of a host processor, such as a central processing unit (CPU), which is supported by one or more additional processor circuits known as accelerator processors or accelerator units. For example, a system-on-chip (SoC) includes a host processor and one or more accelerator processors that perform specialized tasks more efficiently or quickly than if performed by the host processor. Multiple host clients (e.g., host applications, hypervisors, guest operating systems) run simultaneously by sharing access to the host processor. Additionally, the host clients operate concurrently with accelerator clients implemented on the accelerator processors (e.g., unmanaged or managed by the guest operating systems running on the host processor). To support the simultaneous execution of these various clients, each client has access to a shared physical memory. If access between the host and accelerator processors and the shared memory is not properly supervised, there is a risk that sensitive client information is corrupted or stolen by malfunctioning or malicious clients.

Conventional security features implement memory access controls to prevent host clients from inadvertently or maliciously accessing the physical memory allocated to other host clients. For example, when two guest operating systems are running on a host processor, conventional access controls ensure that each guest operating system has access to a designated memory area and does not have access to other areas allocated to other guest operating systems.

Memory access controls involving guest operating systems are conventionally implemented using hypervisors. Guest operating systems, for example, enforce restrictions on virtual memory translations (e.g., physical to virtual address conversions, virtual to physical address conversions) from applications managed under that guest operating system to prevent memory conflicts between them. When a host processor runs multiple guest operating systems, a hypervisor ensures virtual memory space of each guest operating system is allocated to a different corresponding guest region of physical memory spaces.

The hypervisor is implemented between the memory and each of the guest operating systems. When executed on the host processor, the hypervisor prevents one guest operating system from accessing memory of another guest operating system based on memory privileges, which specify allocations of the physical memory to each guest operating system and application client. As one example, the hypervisor ensures a first guest operating system region of physical memory space is not addressable (e.g., not memory translatable) from a second application associated with a second guest operating system. The hypervisor backstops the second guest operating system by denying memory translations that appear in memory requests or I/O communications that attempt to address locations within the first guest operating system region and other pages of physical memory space beyond that allocated to the second application.

Conventional memory access controls are deficient in securely managing memory translations from clients implemented outside guest operating system and host processor control. Hypervisors have difficulty managing memory accesses from accelerator clients executing on accelerator processors, including when the accelerator clients are managed by guest operating systems executing on host processors. For accelerator clients, a hypervisor in various examples is a lone gatekeeper for memory access. Memory of the hypervisor is potentially corruptible by rogue accelerator clients. A hypervisor that is untrusted because of corruptible memory poses a significant risk to security and system integrity.

In contrast to conventional security features and memory access controls, an efficient confidential compute check is described. A confidential compute manager is implemented in a security layer located between a hypervisor or guest operating system and a physical memory. The confidential compute manger, for example, executes the confidential compute check from a security processor based on intercepted memory translations received from either a host processor or one or more accelerator units. The confidential compute manager vets memory translation parameters (e.g., a memory address and client identifier) associated with each of the memory translations before engaging with a memory controller to cause a memory operation specified for the memory translations. The confidential compute check compares a client identifier associated with a memory translation to client permissions (e.g., ownership and access rights) that describe an authorized client for each allocated region of memory, including an authorized client for an address of the memory translation.

The confidential compute check acts as a safeguard of the hypervisor, which in various implementations is an untrusted hypervisor relying on potentially corruptible memory. Despite the untrusted nature of the hypervisor, the confidential compute check ensures that authorized clients have access to each physical memory page. If the rogue accelerator clients mentioned above attempt to access physical memory allocated to a hypervisor or another client, the confidential compute check returns an error message to the rogue accelerator client to indicate lack of ownership or access rights to that physical memory. Through implementations of the confidential compute check, risks to the security and integrity of physical memory accesses from accelerator-supported processing systems are reduced.

In one or more implementations, an apparatus includes a processing system that has a host processor and one or more accelerator units. The accelerator units execute accelerator clients, which support one or more host clients executing (e.g., concurrently) at the host processor. Each client is allocated a distinct region of physical memory shared with the host processor and accelerator units.

In addition to the processing system, the apparatus includes a security circuit (e.g., secure processor, enclave, circuit, logic). The security circuit executes operations outside the control of the host processor and accelerator units to implement a confidential compute manager (e.g., based on instructions executed by software or firmware within the security circuit, based on programmable hardware logic) that securely manages access to the shared memory.

In at least one example, the confidential compute manager controls access to memory in conjunction with at least one of a hypervisor, a guest operating system, or other client executing on the processing system (e.g., to backstop conventional security features). For example, the hypervisor communicates with the confidential compute manager to submit memory translation parameters on behalf of the clients. In at least one aspect, the confidential compute manager manages the memory accesses as a separate security feature, without help from the other clients executing on the processing system. For example, the confidential compute manager communicates directly with the host clients, including the hypervisor and the guest operating systems, and directly with the accelerator clients unmanaged by the guest operating systems.

The confidential compute manager satisfies or denies the memory translations from the host and accelerator clients by communicating directly back to a client sender (e.g., the hypervisor or guest operating system) responsible for the memory translation. The confidential compute manager communicates errors when the memory translations fail. For example, an error is returned to the client sender of the memory translation parameters when the memory translation fails.

To securely manage access to the shared memory, the confidential compute manager maintains client permissions for allocated regions of the memory and ascertains ownership and access rights for each physical memory page to authorize client access to the allocated regions. For example, the confidential compute manager verifies ownership to an address in memory space based on the client permissions. The client permissions enable the confidential compute manager to protect shared accelerator or guest memory from the hypervisor, shield accelerators from other accelerators managed by different guest operating systems, and defend accelerator memory space against unauthorized applications on the same guest operating systems, including containerized applications.

In at least one example, a lookup table or other suitable data structure, known as the Physical Page Ownership (PPO) table, defines the client permissions (e.g., ownership and access rights) for each physical memory page. When the confidential compute manager intercepts a client memory translation, a client identifier specified by memory translation parameters of the memory translation is vetted against a corresponding entry in the PPO table for a memory location or address also obtained from the memory translation parameters of that memory translation. The confidential compute manager of the security circuit checks whether the client identifier corresponds to an authorized client described in the client permissions (e.g., the PPO table) maintained for a memory region encompassing the memory location of the memory translation. Memory translations that pass the compute check and have client identifiers that align with the PPO table entries are permitted to be performed in furtherance of accessing the memory. When memory translations fail the compute check and the memory translation parameters do not align with the PPO table entries, the confidential compute manager refrains from allowing access to the memory and notifies a client sender of the memory translation failure. In one or more examples, memory requests that specify the memory translations are discarded or otherwise not permitted to the memory.

The client permissions (e.g., the PPO table) is established, updated, and accessed exclusively using the security circuit. For example, the security circuit is initialized as the confidential compute manager by firmware executing a secure boot process during system startup. By performing the compute check using a security circuit that is isolated from the host processor and accelerator units, the various clients do not have direct access to the memory, or the client permissions associated with the memory, which promotes security and integrity.

In some aspects, the techniques described herein relate to an apparatus including a plurality of processors each configured to execute memory translations of at least one client that map client virtual memory to corresponding allocations of a physical memory shared among the plurality of processors, and a security circuit configured to authorize client access to allocated regions of the physical memory based on whether an intercepted memory translation corresponds to an authorized client.

In some aspects, the techniques described herein relate to an apparatus, wherein the security circuit is configured to authorize the client access to the allocated regions based on whether a client identifier described in client permissions of the physical memory corresponds to the authorized client.

In some aspects, the techniques described herein relate to an apparatus, wherein the security circuit is configured to authorize the client access to the allocated regions based on whether client ownership and access rights described in the client permissions of the physical memory apply to a memory address of the intercepted memory translation.

In some aspects, the techniques described herein relate to an apparatus, wherein the security circuit is configured to output a memory controller command that satisfies the intercepted memory translation when the intercepted memory translation corresponds to the authorized client.

In some aspects, the techniques described herein relate to an apparatus, wherein the security circuit is configured to refrain from outputting a memory controller command that satisfies the intercepted memory translation when the intercepted memory translation does not correspond to the authorized client.

In some aspects, the techniques described herein relate to an apparatus, wherein the security circuit is configured to implement a security enclave that is initialized during a secure boot sequence and establishes communication between the plurality of processors and the physical memory.

In some aspects, the techniques described herein relate to an apparatus, wherein the at least one client includes a hypervisor that manages one or more guest operating systems and communicates with the security circuit to satisfy guest application memory translations received from guest applications managed by the one or more guest operating systems.

In some aspects, the techniques described herein relate to an apparatus, wherein the plurality of processors include a first processor configured to execute the hypervisor and the one or more guest operating systems, and at least one second processor configured to execute at least one accelerator application managed by the one or more guest operating systems.

In some aspects, the techniques described herein relate to an apparatus, wherein the first processor includes a host processor and the at least one second processor includes an accelerator processor.

In some aspects, the techniques described herein relate to an apparatus, wherein the one or more guest operating systems include a first guest operating system that maps a first client virtual memory to a first allocated region of the physical memory, and a second guest operating system that maps a second client virtual memory to a second allocated region of the physical memory.

In some aspects, the techniques described herein relate to a system including a host processor and at least one accelerator processor each configured to execute memory translations of at least one client that map client virtual memory to corresponding physical memory allocations, a physical memory that is shared between the host processor and the at least one accelerator processor, and a security circuit configured to authorize client access to allocated regions of the physical memory based on whether a client identifier and a memory address from an intercepted memory translation corresponds to an authorized client with ownership and access rights to the memory address.

In some aspects, the techniques described herein relate to a system, wherein the host processor is configured to execute a guest operating system that abstracts a virtual memory mapping one or more accelerator clients executed on the at least one accelerator processor to a corresponding allocated region of the physical memory, and the security circuit is further configured to communicate with the guest operating system to obtain the intercepted memory translation.

In some aspects, the techniques described herein relate to a system, wherein the guest operating system implements an application container that manages execution of the one or more accelerator clients.

In some aspects, the techniques described herein relate to a system, wherein the at least one accelerator processor includes a plurality of accelerator processors that are each operable to execute on different accelerator clients.

In some aspects, the techniques described herein relate to a system, wherein the security circuit includes a different corresponding interface to communicate with each client executed by the host processor and the at least one accelerator processor.

In some aspects, the techniques described herein relate to a system, wherein the security circuit is configured to communicate with a memory controller of the physical memory to satisfy each memory translation when the intercepted memory translation corresponds to the authorized client, and communicates an error to a client sender of the intercepted memory translation when the intercepted memory translation does not correspond to the authorized client.

In some aspects, the techniques described herein relate to a method including maintaining, by a security processor, client permissions that authorize client ownership and access rights to allocated regions of a system memory, and authorizing, by the security processor, client access to the allocated regions of the system memory based on whether a client identifier and a memory address from an intercepted memory translation corresponds to an authorized client with ownership and access rights to the memory address.

In some aspects, the techniques described herein relate to a method, further including establishing, by the security processor, the client permissions by responding to memory allocation requests received from a guest operating system executing on a host processor or an accelerator client executing on an accelerator processor to record at least one authorized client in the client permissions to each of the allocated regions.

In some aspects, the techniques described herein relate to a method, further including outputting, by the security processor, a memory controller command that satisfies the intercepted memory translation in response to authorizing the client access.

In some aspects, the techniques described herein relate to a method, further including communicating, by the security processor, an error to a client sender of the intercepted memory translation executing on a host processor or an accelerator processor in response to a failed authorization of the client access.

FIG. 1 is a block diagram of a processing system configured to execute one or more applications, in accordance with one or more implementations. FIG. 1 includes a processing system 100 configured to execute one or more applications, such as compute applications (e.g., machine-learning applications, neural network applications, high-performance computing applications, databasing applications, gaming applications), graphics applications, and the like. Examples of devices in which the processing system is implemented include, but are not limited to, a server computer, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer or computer for another type of vehicle, a networking device, a medical device or system, and other computing devices or systems.

In the illustrated example, the processing system 100 includes a central processing unit (CPU) 102, which is also referred to as a "host processor". In one or more implementations, the CPU 102 is configured to run an operating system (OS) that manages the execution of applications. For example, at least one guest OS 104 is configured to schedule the execution of tasks (e.g., instructions) for applications, allocate portions of resources (e.g., system memory 106, CPU 102, input/output (I/O) device 108, accelerator unit (AU) 110, which is also referred to as an accelerator processor, storage 112, I/O circuitry 114) for the execution of tasks for the applications, provide an interface to I/O devices (e.g., I/O device 108) for the applications, or any combination thereof.

The CPU 102 includes one or more processor chiplets 116, which are communicatively coupled together by a data fabric 118 in one or more implementations.

Each of the processor chiplets 116, for example, includes one or more processor cores 120, 122 configured to concurrently execute one or more series of instructions, also referred to herein as "threads," for an application. Further, the data fabric 118 communicatively couples each processor chiplet 116-N of the CPU 102 such that each processor core (e.g., processor cores 120) of a first processor chiplet (e.g., 116-1) is communicatively coupled to each processor core (e.g., processor cores 122) of one or more other processor chiplets 116. Though the example embodiment presented in FIG. 1 shows a first processor chiplet (116-1) having three processor cores (120-1, 120-2, 120-K) representing a K number of processor cores 122 and a second processor chiplet (116-N) having three processor cores (e.g., 122-1, 122-2, 122-L) representing an L number of processor cores 122, in other implementations (L being an integer number greater than or equal to one), each processor chiplet 116 may have any number of processor cores 120, 122. For example, each processor chiplet 116 can have the same number of processor cores 120, 122 as one or more other processor chiplets 116, a different number of processor cores 120, 122 as one or more other processor chiplets 116, or both.

Examples of connections which are usable to implement data fabric include but are not limited to, buses (e.g., a data bus, a system, an address bus), interconnects, memory channels, through silicon vias, traces, and planes. Other example connections include optical connections, fiber optic connections, and/or connections or links based on quantum entanglement.

In this example, a confidential compute manager (CCM) 124 is depicted in the I/O circuitry 114 of the processing system 100. In variations, however, the CCM 124 is included in and/or is implemented by one or more different components of the processing system 100, such as the CPU 102, the memory 106, the I/O device 108, the AU 110, the storage 112, the I/O circuitry 114, and so forth. In at least one implementation, the CCM 124 or portions of the CCM 124 are included in at least two of the depicted components of the processing system 100. By way of example, the CCM 124 may be included in or otherwise implemented by at least the I/O circuitry 114 and the memory 106.

Additionally, within the processing system 100, the CPU 102 is communicatively coupled to an I/O circuitry 114 by a connection circuitry 128. For example, each processor chiplet 116 of the CPU 102 is communicatively coupled to the I/O circuitry 114 by the connection circuitry 128. The connection circuitry 128 includes, for example, one or more data fabrics, buses, buffers, queues, and the like. The I/O circuitry 114 is configured to facilitate communications between two or more components of the processing system 100 such as between the CPU 102, system memory 106, display 130, universal serial bus (USB) devices, peripheral component interconnect (PCI) devices (e.g., I/O device 108, AU 110), storage 112, and the like.

As an example, system memory 106 includes any combination of one or more volatile memories and/or one or more non-volatile memories, examples of which include dynamic random-access memory (DRAM), static random-access memory (SRAM), non-volatile RAM, and the like. To manage access to the system memory 106 by CPU 102, the I/O device 108, the AU 110, and/or any other components, the I/O circuitry 114 includes one or more memory controllers 132. These memory controllers 132, for example, include circuitry configured to manage and fulfill memory access requests having memory translations and memory translation parameters, which are issued from the CPU 102, the I/O device 108, the AU 110, or any combination thereof. Examples of such requests and memory translations include memory translations to perform read requests, write requests, fetch requests, pre-fetch requests, or any combination thereof. That is to say, these memory controllers 132 are configured to manage access to the data stored at one or more memory addresses within the system memory 106, such as by CPU 102, the I/O device 108, and/or the AU 110.

When an application is to be executed by processing system 100, the guest OS 104 running on the CPU 102 is configured to load at least a portion of program code 134 (e.g., an executable file) associated with the application from, for example, a storage 112 into system memory 106. This storage 112, for example, includes a non-volatile storage such as a flash memory, solid-state memory, hard disk, optical disc, or the like configured to store program code 134 for one or more applications.

To facilitate communication between the storage 112 and other components of processing system 100, the I/O circuitry 114 includes one or more storage connectors 136 (e.g., universal serial bus (USB) connectors, serial AT attachment (SATA) connectors, PCI Express (PCIe) connectors) configured to communicatively couple storage 112 to the I/O circuitry 114 such that I/O circuitry 114 is capable of routing signals to and from the storage 112 to one or more other components of the processing system 100.

In association with executing an application, in one or more scenarios, the CPU 102 is configured to issue one or more instructions (e.g., threads) to be executed for an application to the AU 110. The AU 110 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 110 includes one or more compute units that concurrently execute one or more threads of an application and store data resulting from the execution of these threads in AU memory 138. This AU memory 138, for example, includes any combination of one or more volatile memories and/or non-volatile memories, examples of which include caches, video RAM (VRAM), or the like. In one or more implementations, these compute units are also configured to execute these threads based on the data stored in one or more physical registers 140 of the AU 110.

To facilitate communication between the AU 110 and one or more other components of processing system 100, the I/O circuitry 114 includes or is otherwise connected to one or more connectors, such as PCI connectors 142 (e.g., PCIe connectors) each including circuitry configured to communicatively couple the AU 110 to the I/O circuitry such that the I/O circuitry 114 is capable of routing signals to and from the AU 110 to one or more other components of the processing system 100. Further, the PCIe connectors 142 are configured to communicatively couple the I/O device 108 to the I/O circuitry 114 such that the I/O circuitry 114 is capable of routing signals to and from the I/O device 108 to one or more other components of the processing system 100.

By way of example and not limitation, the I/O device 108 includes one or more keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 108 is configured to execute one or more operations, tasks, instructions, or any combination thereof based on one or more physical registers 144 of the I/O device 108. In one or more implementations, such physical registers 144 are configured to maintain data (e.g., operands, instructions, values, variables) indicating one or more operations, tasks, or instructions to be performed by the I/O device 108.

To manage communication between components of the processing system 100 (e.g., AU 110, I/O device 108) that are connected to PCI connectors 142, and one or more other components of the processing system 100, the I/O circuitry 114 includes PCI switch 146. The PCI switch 146, for example, includes circuitry configured to route packets to and from the components of the processing system 100 connected to the PCI connectors 142 as well as to the other components of the processing system 100. As an example, based on address data indicated in a packet received from a first component (e.g., CPU 102), the PCI switch 146 routes the packet to a corresponding component (e.g., AU 110) connected to the PCI connectors 142.

Based on the processing system 100 executing a graphics application, for instance, the CPU 102, the AU 110, or both are configured to execute one or more instructions (e.g., draw calls) such that a scene including one or more graphics objects is rendered. After rendering such a scene, the processing system 100 stores the scene in the storage 112, displays the scene on the display 130, or both. The display 130, for example, includes a cathode-ray tube (CRT) display, liquid crystal display (LCD), light emitting diode (LED) display, organic light emitting diode (OLED) display, or any combination thereof. To enable the processing system 100 to display a scene on the display 130, the I/O circuitry 114 includes display circuitry 148. The display circuitry 148, for example, includes high-definition multimedia interface (HDMI) connectors, DisplayPort connectors, digital visual interface (DVI) connectors, USB connectors, and the like, each including circuitry configured to communicatively couple the display 130 to the I/O circuitry 114. Additionally or alternatively, the display circuitry 148 includes circuitry configured to manage the display of one or more scenes on the display 130 such as display controllers, buffers, memory, or any combination thereof.

Further, the CPU 102, the AU 110, or both are configured to concurrently run one or more virtual machines (VMs), which are each configured to execute one or more corresponding applications. To manage communications between such VMs and the underlying resources of the processing system 100, such as any one or more components of processing system 100, including the CPU 102, the I/O device 108, the AU 110, and the system memory 106, the I/O circuitry 114 includes memory management unit (MMU) 146 and input-output memory management unit (IOMMU) 148. The MMU 150 includes, for example, circuitry configured to manage memory requests, such as indicating memory translations from the CPU 102 to the system memory 106. For example, the MMU 150 is configured to handle memory requests issued from the CPU 102 and associated with a VM running on the CPU 102. These memory requests, for example, request access to read, write, fetch, or pre-fetch data residing at one or more virtual addresses (e.g., guest virtual addresses) each indicating one or more portions (e.g., physical memory addresses) of the system memory 106. Based on receiving a memory request from the CPU 102, the MMU 150 is configured to perform a memory translation to translate the virtual address indicated in the memory request to a physical address in the system memory 106 and by fulfilling the memory translation, then fulfill the memory request. The IOMMU 152 includes, for example, circuitry configured to manage memory requests (memory-mapped I/O (MMIO) requests) from the CPU 102 to the I/O device 108, the AU 110, or both, and to manage memory requests (direct memory access (DMA) requests) from the I/O device 108 or the AU 110 to the system memory 106. For example, to access the registers 144 of the I/O device 108, the registers 140 of the AU 110, and/or the AU memory 138, the CPU 102 issues one or more MMIO requests. Such MMIO requests each request access to read, write, fetch, or pre-fetch data residing at one or more virtual addresses (e.g., guest virtual addresses) which each represent at least a portion of the registers 144 of the I/O device 108, the registers 140 of the AU 110, or the AU memory 138, respectively. As another example, to access the system memory 106 without using the CPU 102, the I/O device 108, the AU 110, or both are configured to issue one or more DMA requests. Such DMA requests each request access to read, write, fetch, or pre-fetch data residing at one or more virtual addresses (e.g., device virtual addresses) which each represent at least a portion of the system memory 106. Based on receiving an MMIO request or DMA request, the IOMMU 152 is configured to translate the virtual address indicated in the MMIO or DMA request to a physical address and fulfill the request.

In variations, the processing system 100 can include any combination of the components depicted and described. For example, in at least one variation, the processing system 100 does not include one or more of the components depicted and described in relation to FIG. 1. Additionally or alternatively, in at least one variation, the processing system 100 includes additional and/or different components from those depicted. The 100 is configurable in a variety of ways with different combinations of components in accordance with the described techniques.

Figure 2:
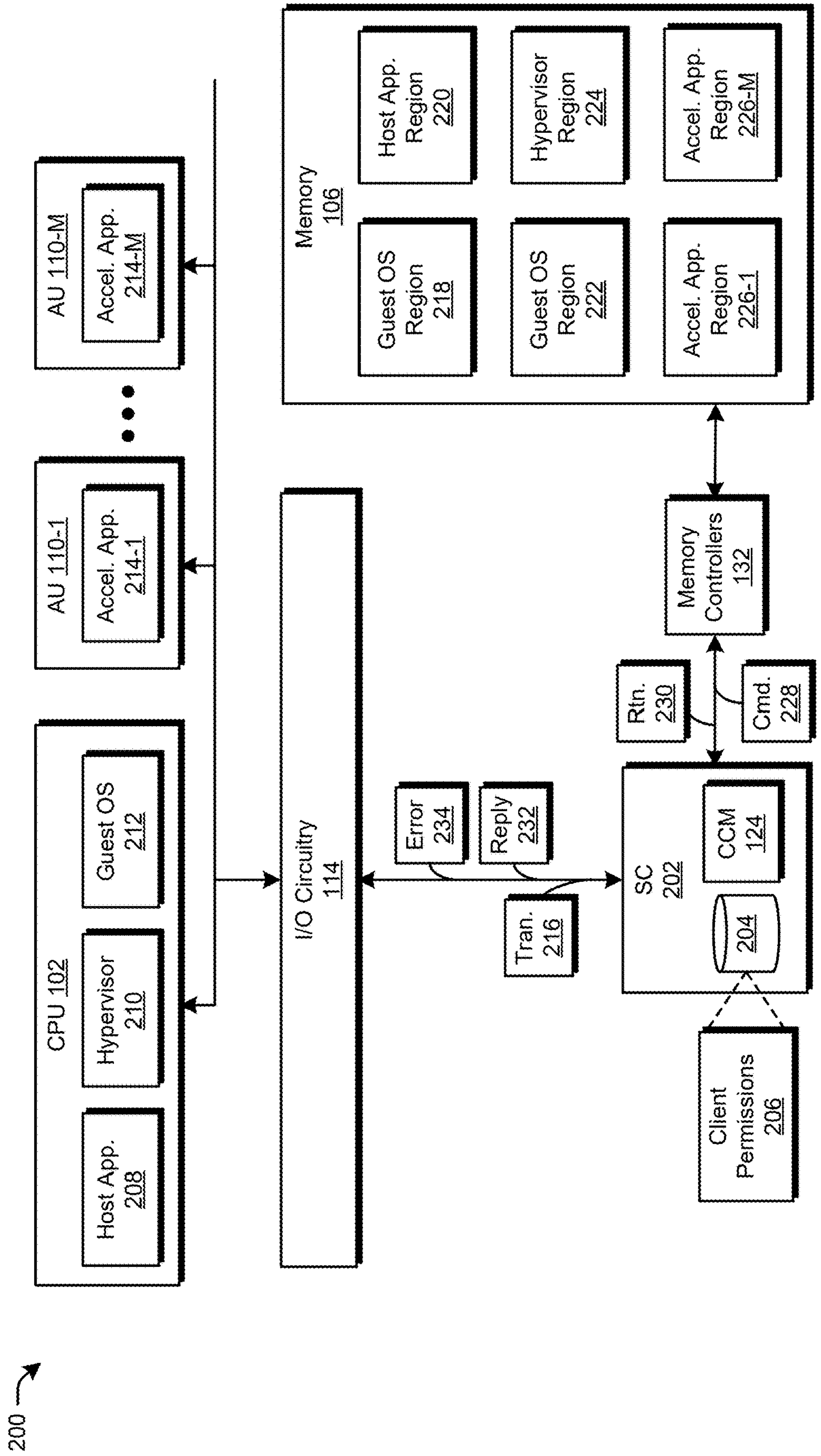
FIG. 2 is a block diagram of a non-limiting example system configured to employ efficient confidential compute checks.

FIG. 2 is a block diagram of a non-limiting example system 200 configured to employ efficient confidential compute checks. The system 200 represents an example of the processing system 100 and is described in the context of FIG. 1. The system 200 includes the CPU 102 and multiple instances of the AU 110 (labeled as AU 110-1 through AU 110-M, where M is a positive number) communicatively coupled to the memory 106 through the I/O circuitry 114 and the memory controllers 132. The system 200 uses the CCM 124 to implement a security layer between the memory controllers 132 and one or more of the CPU 102, the AU 110-1, and the AU 110-M. The security layer of the CCM 124 intercepts and manages communications with the memory 106 to manage permissions and control access to the memory 106.

As depicted in FIG. 2, the CCM 124 is implementable on a security circuit 202, which is separate from the CPU 102, the AU 110-1, the AU 110-M, the memory 106, the memory controllers 132, and the I/O circuitry 114. For example, the security circuit 202 is configured as a security enclave including an isolated security processor and an isolated security memory.

The security circuit 202 and the CCM 124 are initialized, for instance, during a secure boot sequence executed when the system 200 starts or resets. The secure boot sequence communicatively couples the security circuit 202 and the CCM 124 with the I/O circuitry 114 and the memory controllers 132, such as to be operable to intercept communications between the memory 106 and the CPU 102, the AU 110-1, and the AU 110-M. In at least one example, a security processor of the security circuit 202 executes firmware instructions of the CCM 124. The firmware causes the CCM 124 to use a security memory of the security circuit 202 to isolate memory management data 204 from other circuits of the system 200. The memory management data 204 includes client permissions 206, which are not accessible outside the CCM 124.

The security circuit 202 is a single access point for modifying the client permissions 206. Clients request privilege updates (e.g., allocations and deallocations of the memory 106) through communications with the CCM 124. The security circuit 202 (e.g., a security processor with access to a secure memory where the client permissions 206 are stored) isolates the client permissions 206 to ensure the client permissions 206 remain secure and usable by the CCM 124, and not compromised or misconfigured.

The client permissions 206 describe ownership and access rights for each physical location (e.g., each page) of the memory 106. In at least one variation, the client permissions 206 include a unique client identifier for each host and accelerator client (or process thereof) that is executing in the system 200. For each client identifier, the client permissions 206 indicate locations or regions of the memory 106 currently allocated to that client process, including whether that client process has one or both read and write permissions to that physical part of the memory 106. The client permissions 206 describe ownership and access rights assigned to a plurality of different host and accelerator clients each having concurrent access to the memory 106. In at least one implementation, the client permissions 206 describe multiple permissions for performing different types of memory accesses (e.g., to grant read permissions separate from granting write permissions) at a corresponding region of the memory 106. In one or more variations, the client permissions 206 describe limited permissions for performing limited types of memory accesses (e.g., read permission without write permission, write permission within read permission) at a corresponding region of the memory 106.

The CPU 102 is illustrated in FIG. 2 as executing multiple host clients, and for simplicity of the drawing, the AU 110-1 and the AU 110-M are each shown executing a single accelerator client. In various other examples, the AU 110-1 and the AU 110-M each execute one or multiple accelerator clients that use the memory 106. The host and accelerator clients referred to herein represent the series of instructions or threads for an application, as referred to above in the description of FIG. 1. For example, each of the host clients represents a set of software or firmware instructions executed by the CPU 102, and each of the accelerator clients represents a set of software or firmware instructions executed by one or more of the AU 110-1 and the AU 110-M.

At least one of the host clients executing on the CPU 102 includes a host application 208, a hypervisor 210, and one or more instances of a guest OS 212. The guest OS 212 is an example of the OS 104, and the hypervisor is an example of the hypervisor 126 as depicted in FIG. 1. In at least one implementation, multiple instances of the guest OS 2121 execute on the CPU 102, concurrently. The guest OS 212, and each instance thereof, represents an execution environment for implementing at least one instance of the host application 208. For example, when the host application 208 is to be executed by CPU 102, the guest OS 212 running on the CPU 102 is configured to load at least a portion of program code associated with the host application 208 into the memory 106.

The hypervisor 210 executes between the I/O circuitry 114 and the guest OS 212 and the host application 208. The guest OS 212 executes at the CPU 102 (e.g., as one or more instances of the guest OS 104) to map virtual memory spaces established for each client across different physical allocations of the memory 106. Each virtual memory space established by the hypervisor 210 corresponds to a unique region (e.g., page) of the memory 106, which is allocated to that client.

Each instance of the guest OS 212 runs within a virtualized environment managed by the hypervisor 210 and that is outside control of each other instance of the guest OS 212. The guest OS 212 abstracts a virtual memory, which maps memory space used by the accelerator clients to be corresponding allocated regions of the memory 106. The guest OS 212 is configured as a virtual machine to support execution of other accelerator applications or accelerator clients executing on the AU 110-1 or the AU 110-M. The guest OS 212, or separate instances of the guest OS 212, represent execution environments to implement and support memory access from other applications that are outside control of the CPU 102. An accelerator application 214-1 executes at the AU 110-1 and an accelerator application 214-M executes at the AU 110-M. In at least one aspect, when the accelerator application 214-1 and the accelerator application 214-M are to be executed by the AU 110-1 and the AU 110-M, the guest OS 212 running on the CPU 102 is configured to load at least a portion of the program code 134 associated with the accelerator application 214-1 and the accelerator application 214-M into the memory 106.

In contrast to conventional processing systems that trust hypervisors to manage physical memory allocations and control memory translations associated with accesses to physical memory (e.g., to prevent conflicts and data leaks), the system 200 implements the CCM 124 to offload certain tasks of a conventional hypervisor and implement other features that enhance the security and integrity of the memory 106. The security circuit 202 implements the CCM 124 in an execution layer that is beneath the hypervisor 210, for example, in between the I/O circuitry 114 and the memory controllers 132 of the memory 106. In at least one example, the security circuit 202 is included in the I/O circuitry 114 with the memory controller 122. In at least one other example, the security circuit 202 is implemented in a secure enclave, such as on a separate circuit or using separate logic from the I/O circuitry 114. The security circuit 202 is configured to interrupt direct connections between the I/O circuitry 114 and the memory controllers 132 and the memory 106.

With the CCM 124 executing on the security circuit 202, the hypervisor 210 is configured to execute at the CPU 102 by interfacing with the CCM 124 to satisfy memory translation 216 received from the host application 208, the guest OS 212, and the accelerator applications 214. The memory translation 216, for example, are included as memory translation parameters in a memory request access to read, write, fetch, or pre-fetch client data residing at one or more virtual addresses of client virtual space managed by the hypervisor 210. The hypervisor 210 transmits memory translation parameters of the memory translation 216 to the CCM 124 to request access to the client data residing at portions of the memory 106 (e.g., physical memory addresses, physical pages), which maps to the virtual addresses of the memory translation 216. In at least one example, the accelerator applications 214 communicate directly with the security circuit 202 to submit the memory translation 216 to the CCM 124, without relying on the guest OS 212.

The CCM 124 manages the memory translation 216 for allocations of the memory 106 and the memory translation

216 for access to allocated regions of the memory 106. The memory management data 204 is protected by the security circuit 202, which enables the CCM 124 to securely condition each allocation or translation request based on the client permissions 206.

As depicted in FIG. 2, in response to handling the memory translation 216 for multiple memory allocations, the memory 106 is divided into several different physical regions allocated to the different clients executing in the system 200. For example, the CCM 124 communicates with the memory controllers 132 to allocate a guest OS region 218 of the memory 106 to a first instance of the guest OS 212. A host application region 220 of the memory 106 is allocated by the CCM 124 to the host application 208, another guest OS region 222 is allocated to another (e.g., a second) instance of the guest OS 212, a hypervisor region 224 of the memory 106 is allocated to the hypervisor 210, and so forth for each of the host clients executing at the CPU 102. Accelerator application regions 226 of the memory 106, which are labeled as accelerator application region 226-1 and accelerator application region 226-M, are allocated by the CCM 124 to the accelerator applications 214 and each other accelerator client executing at the AU 110-1 and the AU 110-M.

The CCM 124 records ownership and access rights for each allocated region of the memory 106 within the client permissions 206 securely preserved in the memory management data 204. For example, the CCM 124 stores a client identifier of the guest OS 104 in an entry in the client permissions 206 that records ownership and access rights of the OS region 218. The CCM 124 stores one or more client identifiers in each entry of the client permissions 206 to records ownership and access rights of each allocated region of the memory 106 to clients corresponding to the client identifiers. The client permissions 206 record ownership and access rights for the host application region 220 to the host application 208, and so forth, including storing client identifiers for one or more of the accelerator applications 214 to record ownership and access rights for each of the accelerator application regions 226.

In addition to managing memory allocations, the CCM 124 manages the memory translation 216 for obtaining access to the allocated regions of the memory 106. The CCM 124 verifies that each memory translation parameter of the memory translation 216 satisfies the client permissions 206 related to that memory translations. The CCM 124 authorizes each client access by checking whether client identifiers corresponding to an authorized client are described in the client permissions 206 maintained for each memory region specified by the memory translation 216. In at least one example, the CCM 124 stores the client permissions 206 in a lookup table or other suitable data structure, known as the PPO table. When the CCM 124 intercepts the memory translation 216, a client identifier specified by the memory translations is vetted against a corresponding entry in the PPO table corresponding to a memory location described by the memory translation parameters of the memory translation 216. The CCM 124 checks whether the client identifier corresponds to an authorized client described in the PPO table for that memory location.

The CCM 124 is not limited to safeguarding accesses to the memory 106 originating from the CPU 102 or the hypervisor 210. The CCM 124 is configured to secure access to the memory 106 based on the memory translation 216 received directly from the accelerator unit 110-1 or the accelerator unit 110-M. This enhanced protection enables trusted memory access to the memory 106 without relying on the hypervisor 210, which is untrusted, or the hypervisor region 224 of the memory 106, which causes the untrust by being corruptible like other allocated regions of the memory 106.

Memory translations that pass the compute check and have client identifiers that align with the PPO table entries are permitted to produce results from the memory 106. In at least one example, if the memory translation 216 passes the confidential compute check performed by the CCM 124, a memory operation based on the memory translation 216 is allowed. For example, a read request is allowed by the CCM 124 to pass to the memory controllers 132 as a command 228 to retrieve client data stored in the accelerator application region 226-1. The read request is on behalf of the accelerator application 214-1 or the guest OS 212, which is identified from the memory translation parameters of the memory translation 216 accompanying the read request. The CCM 124 receives a controller return 230 issued by the memory controller 132 in response to satisfying the command 228. The CCM 124 allows the controller return 230 to be included within a memory reply 232 that is sent back to the client sender that issued the memory translation 216 use to satisfy the command 228. For example, the memory reply 232 is returned to the accelerator application 214-1 or the guest operating system 212 to allow the accelerator application 214-1 to process the client data.

When memory translations fail the compute check and do not align with the PPO table entries, the CCM 124 refrains from accessing the memory 106 and notifies a requesting client of the failure. In one or more examples, if the memory translation 216 is unauthorized, an accompanying memory operation, memory request, or memory command is discarded, recorded in an error log, or otherwise not permitted to effect operations of the memory controllers 132 or the memory 106. Each time the memory translation 216 fails or does not pass the confidential compute check performed by the CCM 124, no controller command 228 is issued to the memory controllers 132, which prevents the access request from being full filled. For example, the memory translation 216 includes a read request issued by the accelerator application 214-M to retrieve client data stored in the accelerator application region 226-1. The CCM 124 determines that an identifier of the accelerator application 214-M is not included in the PPO tables (e.g., the client permissions 206) as an authorized client for the accelerator application region 226-1 (e.g., the accelerator application 214-1 has exclusive access to the accelerator application region 226-1). The security circuit 202 refrains from communicating with the memory controllers 132 and the CCM 124 communicates an error 234 to a client sender for indicating the memory translations that fail the check. For example, the error 234 is returned to the accelerator application region 226-M to indicate the memory translation 216 failed.

With extra protection provided to the memory 106, the CCM 124 protects the hypervisor region 224 of the memory 106 from accelerator client and guest OS access. Likewise, the accelerator application regions 226 and the guest OS region 222 of the memory 106 are protected from the hypervisor 210, the guest OS 212, and the host application 208. In addition, the accelerator application 214-1 is shielded from the accelerator application 214-M, whether accessing the memory 106 directly, or through different or the same instance of the guest OS 212, including containerized applications and programs.

As mentioned above, the client permissions 206 (e.g., the PPO table) is established, updated, and accessed exclusively using the security circuit 202 and the CCM 124 executed within. For example, the security circuit 202 is initialized to implement the CCM 124 by executing firmware checked, verified, and authenticated during a secure boot process when the system 200 starts or resets. By performing the confidential compute check using the CCM 124 running on the security circuit 202 that is isolated from the CPU 102 and accelerator unit 110-1 and the accelerator 110-M, the various clients executing in the system 200 do not have direct access to the memory 106 or the client permissions 206 associated with the memory 106, which promotes security and integrity.

As referred to throughout this disclosure, the CCM 124 provides various benefits to implementing secure memory access. As examples, these improvements include more reliable and accurate control over the access to physical memory, capability to protect access across various applications, accelerators, guests, and hypervisors, scalability by implementing checks at different corresponding client interfaces, and potential improved performance through PPO table caching.

Figure 3:
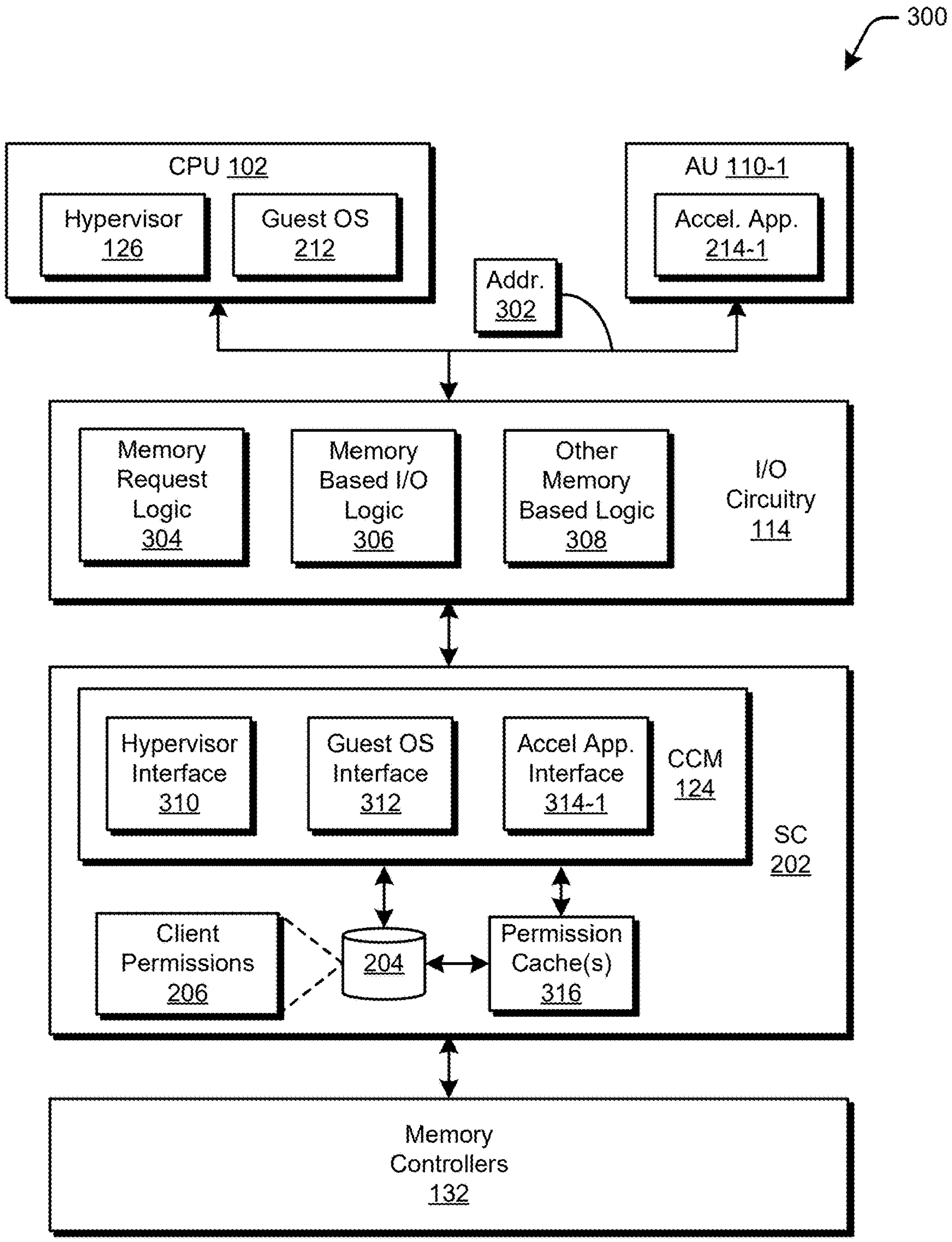
FIG. 3 is a block diagram of a non-limiting example system configured to employ efficient confidential compute checks.

FIG. 3 is a block diagram of a non-limiting example system configured to employ efficient confidential compute checks. The system 300 represents an example of the systems 100 and 200 and is described with reference to similarly labeled elements depicted in FIGS. 1 and 2.

The system 300 includes the CPU 102 and the AU 110-1 communicatively coupled through the I/O circuitry 114 and the CCM 124 to the memory controllers 132. The system 300 uses the security circuit 202 to implement the CCM 124, which executes a security layer between the memory controllers 132 and one or more of the CPU 102 and the AU 110-1. In at least one variation, although not shown, the system 300 includes the AU 110-M or another device, circuit, component, or apparatus further sharing access managed by the CCM 124 through the I/O circuitry 114 to the memory controllers 132.

As depicted in FIG. 3, the CCM 124 checks an address 302 communicated through the I/O circuitry 114 to verify whether access at the addresses 302 is authorized. Although primarily described as being included in memory translations (e.g., address conversions for memory read and write requests), the address 302 is communicated in other types of signals exchanged between the CPU 102, the AU 110-1, and the I/O circuitry 114. For example, the I/O circuitry 114 includes memory request logic 304, memory based I/O logic 306, and other memory based logic 308.

Each different logic or path through the I/O circuitry 114 is potentially used to communicate different types of memory translations, signals, or commands based on an address to information stored by the memory 106, including information accessed outside of regular memory operations (e.g., conventional reads and writes). The memory request logic 304, for example, supports page tables and operations of the I/O circuitry 114 (e.g., the MMU 150 depicted in FIG. 1), for instance, to enable use of the memory 106 to support execution of the guest OS 212. The memory based I/O logic 306, however, includes the IOMMU 152 or the PCI switch 146 depicted in FIG. 1 and maps a portion of the memory 106 to I/O logic of another component of the system 300 (e.g., a sensor). The other component communicates information to the CPU 102 or the AU 110-1 by sending and receiving data through the I/O mapped portion. There are other applications for using the memory 106 beyond serving memory translations for memory requests and implementing memory mapped I/O. Other memory based logic 308 of the I/O circuitry 114 is implementable for various reasons and in various ways to support these other applications.

To facilitate efficient authorization and access control, the CCM 124 includes at least one corresponding interface for each host and accelerator client that is communicating with the CCM 124 through the I/O circuitry 114. The security circuit 202 depicted in FIG. 3 includes at least one physical interface. Each physical interface is configured to receive client identifiers for authorizing the address 302. Also referred to as ingress ports, bus connections, or network interfaces, the CCM 124 includes a hypervisor interface 310 shared with the hypervisor 210, for instance, to authorize the address 302 when included in a memory translation received from the guest OS 212. A guest OS interface 312 is shared with the guest OS 212, and an accelerator application interface 314-1 is shared with the accelerator application 214-1. In at least one implementation, the CCM 124 includes a physical interface or ingress port for each client or each processor supporting execution of one or more clients. For example, although not illustrated, the CCM 124 includes a corresponding interface with the accelerator application 214-M executing on the AU 110-M. In at least one example, there are additional ingress ports for other components and devices connected to the system 300 and not shown for simplicity of the drawings.

In at least one example, the security circuit 202 implements one or more permission caches 316 to improve performance. For example, one or more of the permission caches 316 maintains frequently accessed PPO entries from the PPO table (e.g., the client permissions 206) for each of the interfaces of the CCM 124. The hypervisor interface 310 frequently accesses the hypervisor region 224 and addresses and permissions for the hypervisor region 224 are stored in one of the permission caches 316 corresponding to the hypervisor interface 310. Frequently accessed regions of the guest OS region 222 are stored in one of the permission caches 316 that corresponds to the guest OS interface 312, and frequently accessed regions of the accelerator application region 226-1 are stored in one of the permission caches 316 that corresponds to the accelerator application interface 314-1. A cache controller implemented by the security circuit 202 or the CCM 124 manages the permission caches 316, for example, to ensure multiple copies remain coherent. By quickly addressing a look up at the permission caches 316, latency from accessing the PPO table (e.g., the client permissions 206) is reduced.

The address 302 that reaches the CCM 124 through one of the interfaces refers to a physical location in the memory 106. For example, the address 302 is output from the CPU 102 or the AU 110-1 in virtual form corresponding to a virtual location in a virtual space that maps to an allocated region of the memory 106. In at least one example, the I/O circuitry 114 converts the address 302 to a physical location that is checked by the CCM 124.

In one or more implementations, the hypervisor 210 and the guest OS 212 convert the address 302 into physical form using the memory request logic 304. For example, the guest OS 212 and the hypervisor 210 access page tables managed by the MMU 150 to translate the address 302 into a physical location.

In one or more implementations, the accelerator application 214-1 converts the address 302 into physical form using the memory based I/O logic 306. The accelerator application interface 314-1 is configured to receive the address 302 the memory based I/O logic 306. The accelerator application 214-1 is managed by the guest OS 212, for instance, which assigns the accelerator application 214-1 a virtual address space that corresponds to an allocated region of the memory 106, such as the accelerator application region 226-1.

The address 302 is converted from the virtual address space to a physical page location in the accelerator application region 226-1 upon reaching the accelerator application interface 314-1. For example, prior to reaching the CCM 124, the memory based I/O logic 306 sends the address 302 to a component referred to as the bus interface unit, which is responsible for mapping the address 302 from a virtual space to a corresponding physical address in the memory 106. To accomplish this mapping, the bus interface unit determines where in the memory 106 the address 302 resides. The memory based I/O logic 306 employs an address translation cache to facilitate the mapping of the address 302 in virtual address form to a physical address counterpart. The address translation cache allows for local storage of virtual to physical mappings, preventing the need to access the I/O circuitry 114 (e.g., the IOMMU 152 depicted in FIG. 1) for each memory translation (e.g., including the address 302). The I/O circuitry 114 (e.g., the IOMMU 152) maintains memory page ownership rights indicative of memory allocations managed by the CCM 124.

When a memory translation request is made, the I/O circuitry 114 (e.g., the IOMMU 152) checks the ownership of the relevant memory pages and returns the translated virtual address back to the accelerator application 214-1. The/O circuitry 114 (e.g., the IOMMU 152) is able to do this because the guest OS 212 and the hypervisor 210 populate the page tables, as mentioned above, preserved by the I/O circuitry 114, referred to as page tables. These page tables specify client identifiers indicating client ownership (e.g., an application, an operating system, a hypervisor, a guest OS) to a physical address space. Using this information, the/O circuitry 114 (e.g., the IOMMU 152) retrieves the physical address associated with the virtual address and provides the physical address to the accelerator application 214-1 for use as the address 302. The address 302 is passed to the accelerator application interface 314-1. The CCM 124 checks the address 302 based on the physical addresses in the PPO table entries (e.g., within the client permissions 206) to control access to the memory controllers 132 and the memory 106.

Figure 4:
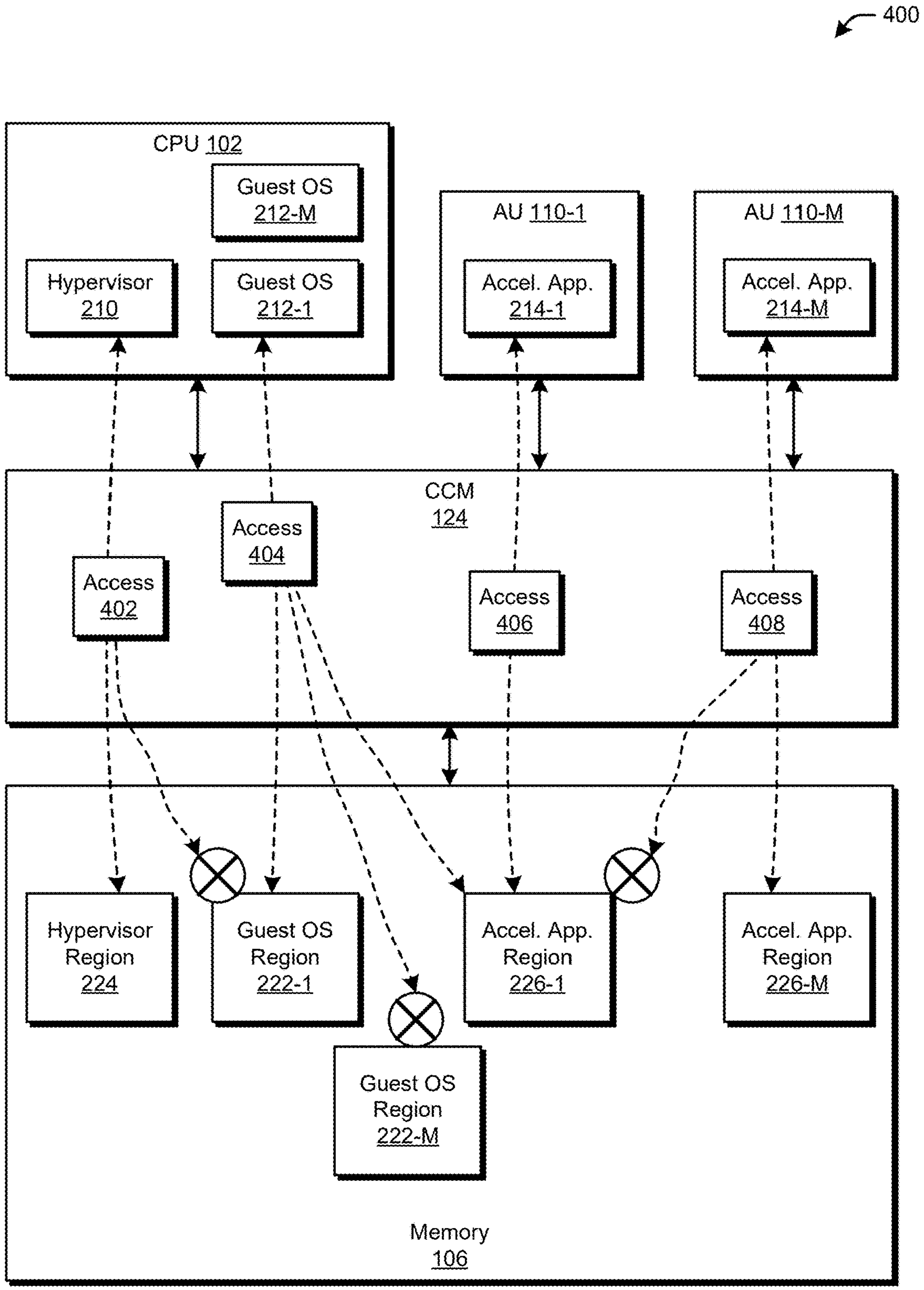
FIG. 4 is a block diagram of a non-limiting example system configured to employ efficient confidential compute checks.

FIG. 4 is a block diagram of a non-limiting example system 400 configured to employ efficient confidential compute checks. The system 400 represents an example of the systems 100, 200, and 300, and is described with reference to similarly labeled elements depicted in FIGS. 1, 2, and 3.

The system 400 includes the CPU 102, the AU 110-1, and the AU 110-M each communicatively coupled to the memory 106 through the CCM 124. The CCM 124 implements a secure access layer between the memory 106 and the host and accelerator clients executing in the system 400 by checking each transaction to a physical page of the memory 106.

The hypervisor 210 executes on the CPU 102 and accesses hypervisor data preserved in the hypervisor region 224 of the memory 106. The client permissions 206 for the hypervisor region 224 authorize access 402 from the hypervisor 210.

The guest OS 212-1 executes on the CPU 102 and accesses guest OS data preserved in a guest OS region 222-1 of the memory 106. The guest OS 212-1 executes at the CPU 102 to abstract a first virtual memory that maps the accelerator application 214-1 to a first allocated region of the memory 106 (e.g., the guest OS region 222-1). The client permissions 206 for the guest OS region 222-1 authorize access 404 from the guest OS 212-1. In addition, the client permissions 206 for the guest OS region 222-1 deny the access 402 from the hypervisor 210. The CCM 124 prevents the hypervisor 210 from accessing memory allocated to the guest OS 212-1.

The guest OS 212-M executes on the CPU 102 and accesses guest OS data preserved in a guest OS region of the memory 106. The guest OS 212-M executes at the CPU 102 to abstract a second virtual memory that maps the accelerator application 214-M to a second allocated region of the memory 106 (e.g., the guest OS region 222-M). The client permissions 206 for the guest OS region 222-M deny the access 404 from the guest OS 212-1. The CCM 124 prevents the guest OS 212-1 from accessing memory allocated to the guest OS 212-M.

In at least one variation, the guest OS 212-1 executes both the accelerator applications 214. For example, the guest OS 212-1 implements an application container that manages execution of the accelerator applications 214 using the guest OS region 222-1 to store application container data.

The accelerator application 214-1 executes on the AU 110-1 and accesses accelerator application data preserved in the accelerator application region 226-1. The client permissions 206 for the accelerator application region 226-1 allow the access 404 from the guest OS 212-1, allow access 406 by the accelerator application 214-1, and denies access 408 by the accelerator application 214-M. The CCM 124 prevents the accelerator application 214-M from accessing memory allocated to the accelerator application 214-1.

The accelerator application 214-M executes on the AU 110-M and accesses accelerator application data preserved in an accelerator application region 226-M of the memory 106. The client permissions 206 for the accelerator application region 226-M allow the access 408 from the accelerator application 214-M.

Figure 5:
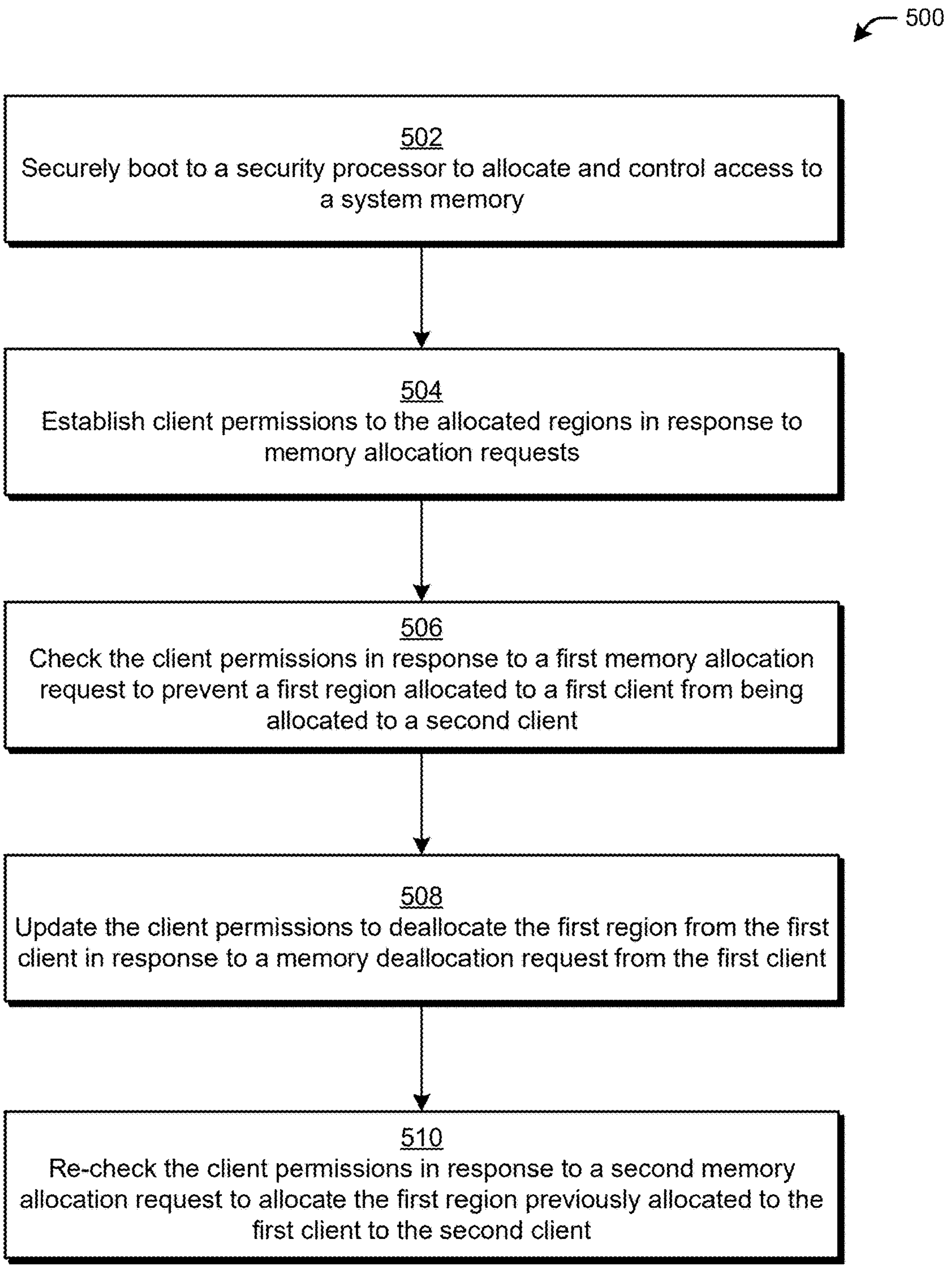
FIG. 5 is a flow diagram depicting a procedure in a non-limiting example implementation of operation of efficient confidential compute checks.

FIG. 5 is a flow diagram depicting a procedure 500 in a non-limiting example implementation of operation of efficient confidential compute checks. The procedure 500 includes operations (or steps) 502 through 510, which may be performed in a different order than depicted in FIG. 5, including examples with additional steps or examples that omit operations.

At 502, a security processor is securely booted to allocate and control access to a system memory. For example, the CCM 124 depicted in FIG. 2 executes on startup at the security circuit 202.

Next, at 504, client permissions are established to the allocated regions in response to memory allocation requests. For example, the CCM 124 depicted in FIG. 2 establishes the client permissions 206 of the guest OS 212, the hypervisor 210, etc. for different allocations of the memory 106 by responding to memory allocation requests received from the guest OS 212, the hypervisor 210, etc. to request different memory regions.

Continuing in the process 500, at 506, the client permissions are checked in response to a first memory allocation request to prevent a first region allocated to a first client from being allocated to a second client. For example, as depicted in FIG. 2, the CCM 124 operates using a one-to-one mapping approach that prevents the hypervisor 210 from requesting memory already allocated to one client to be allocated to another client. The hypervisor 210 is prevented from allocating a portion of the memory 106 to the guest OS 212-M when that part of the memory 106 is already allocated to the guest OS 212-1, for example.

At 508, the client permissions are updated to deallocate the first region from the first client in response to a memory deallocation request from the first client. For example, as depicted in FIG. 2, the CCM 124 processes a deallocation request received from the guest OS 212-1 prior to allocating memory to the guest OS 212-M. If necessary, the CCM 124 is responsible for carrying out memory cleanup operations (e.g., through further communication with the memory controllers 132) after a deallocation occurs.

Finally, at 510, the client permissions are re-checked in response to a second memory allocation request to allocate the first region previously allocated to the first client to the second client. For example, as depicted in FIG. 2, the CCM 124 processes a request from the hypervisor 210 to reallocate a portion of the memory 106 from the guest OS 212-1 to the guest OS 212-M after that part of the memory 106 is deallocated from the guest OS 212-1, for example.

Figure 6:
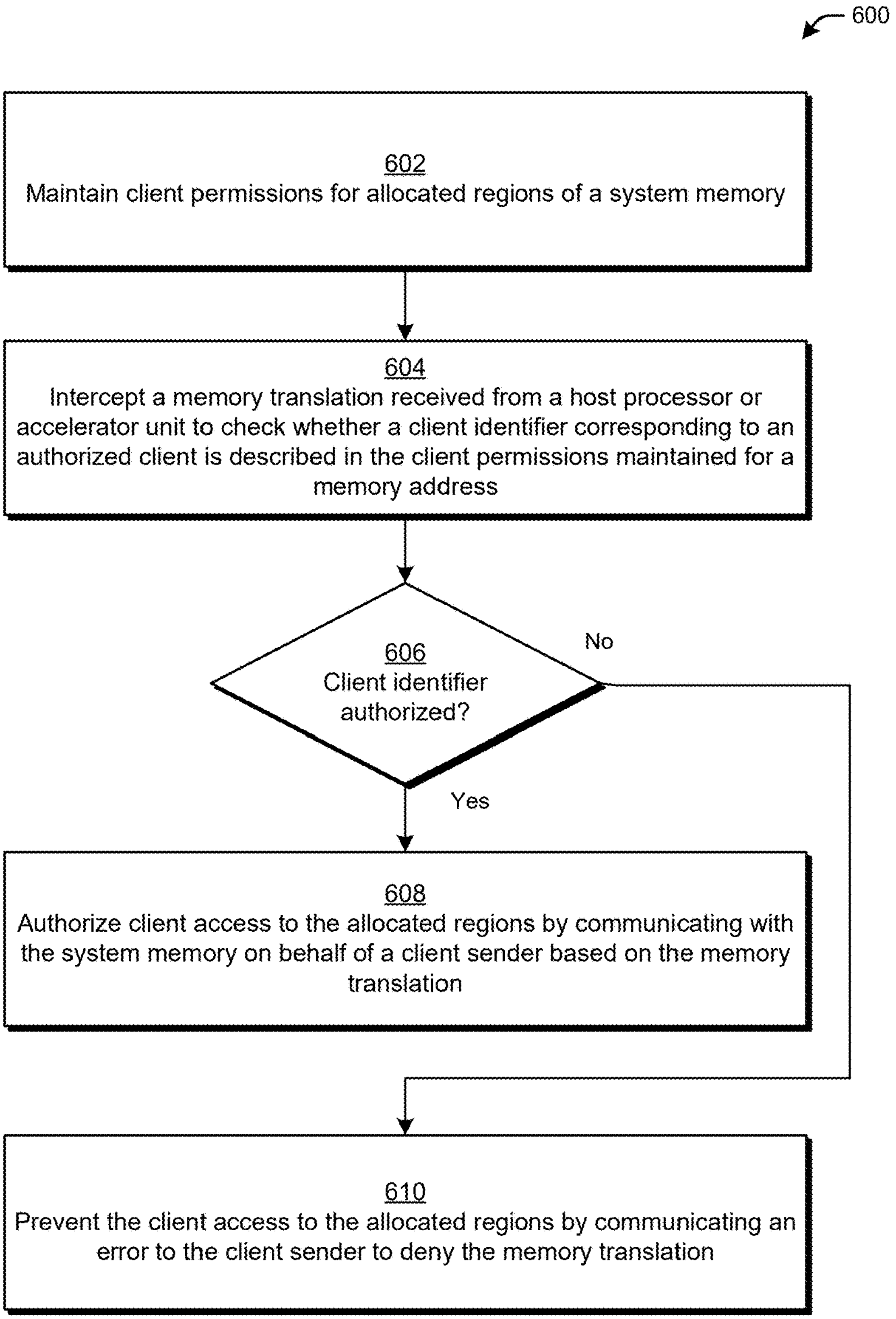
FIG. 6 is a flow diagram depicting a procedure in a non-limiting example implementation of operation of efficient confidential compute checks.

FIG. 6 is a flow diagram depicting a procedure in a non-limiting example implementation of operation of efficient confidential compute checks. The procedure 600 includes operations (or steps) 602 through 610, which may be performed in a different order than depicted in FIG. 6, including examples with additional steps or examples that omit operations.

The process 600 begins at 602 where client permissions for allocated regions of a system memory are maintained. For example, after implementing the step 504 of the process 500, the CCM 124 depicted in FIG. 3 establishes the client permissions 206 preserved in a secure storage of the security circuit 202.

Next in the process, at 604, a memory translation received from a host processor or accelerator unit is intercepted to check whether a client identifier corresponding to an authorized client is described in the client permissions maintained for a memory region specified by memory translation parameters of that memory translation. For example, as depicted in FIG. 3, the CCM 124 receives a physical address (e.g., the address 302) from the accelerator application interface 314-1 and based on checking the permission caches 316 or the client permissions 206, determines whether to authorize the memory translation.

At 606, whether the client identifier is an authorized client for that memory address is determined. For example, as depicted in FIG. 3, the result of the lookup at the permission caches 316 or the client permissions 206 determines whether the process 600 proceeds to step 608 or 610. When the client identifier matches an authorized client, the "YES" path from step 606 is taken to step 608. Otherwise, the "NO" path from step 606 is taken to step 610.

At 608, the client access to the allocated regions is authorized by communicating with the system memory on behalf of a client sender based on the memory translation. For example, as depicted in FIG. 3, the CCM 124 communicates with the memory controllers 132 to obtain the return 230 and generate the reply 232. The CCM 124 communicates via the memory controller 132 with the memory 106 to satisfy each memory translation that passes the check at step 606.

At 610, the client access to the allocated regions is prevented by communicating an error to the client sender to deny the memory translation. The CCM 124, as depicted in FIG. 3, communicates an error to a client sender of each memory translation that fails the check, which includes refraining from communicating with the memory 106 on behalf of the client sender to satisfy the memory translation. Implementing the process 600 enables the CCM 124 to efficiently secure access to the memory 106.

What is claimed is:

1. An apparatus comprising:

a plurality of processors each configured to execute memory translations of at least one client that map client virtual memory to corresponding allocations of a physical memory shared among the plurality of processors; and a security circuit configured to authorize client access to allocated regions of the physical memory based on whether an intercepted memory translation corresponds to an authorized client.

2. The apparatus of claim 1, wherein the security circuit is configured to authorize the client access to the allocated regions based on whether a client identifier described in client permissions of the physical memory corresponds to the authorized client.

3. The apparatus of claim 2, wherein the security circuit is configured to authorize the client access to the allocated regions based on whether client ownership and access rights described in the client permissions of the physical memory apply to a memory address of the intercepted memory translation.

4. The apparatus of claim 1, wherein the security circuit is configured to output a memory controller command that satisfies the intercepted memory translation when the intercepted memory translation corresponds to the authorized client.

5. The apparatus of claim 1, wherein the security circuit is configured to refrain from outputting a memory controller command that satisfies the intercepted memory translation when the intercepted memory translation does not correspond to the authorized client.

6. The apparatus of claim 1, wherein the security circuit is configured to implement a security enclave that is initialized during a secure boot sequence and establishes communication between the plurality of processors and the physical memory.

7. The apparatus of claim 6, wherein the at least one client comprises a hypervisor that manages one or more guest operating systems and communicates with the security circuit to satisfy guest application memory translations received from guest applications managed by the one or more guest operating systems.

8. The apparatus of claim 7, wherein the plurality of processors include a first processor configured to execute the hypervisor and the one or more guest operating systems, and at least one second processor configured to execute at least one accelerator application managed by the one or more guest operating systems.

9. The apparatus of claim 8, wherein the first processor comprises a host processor and the at least one second processor comprises an accelerator processor.

10. The apparatus of claim 8, wherein the one or more guest operating systems include a first guest operating system that maps a first client virtual memory to a first allocated region of the physical memory, and a second guest operating system that maps a second client virtual memory to a second allocated region of the physical memory.

11. A system comprising:

a host processor and at least one accelerator processor each configured to execute memory translations of at least one client that map client virtual memory to corresponding physical memory allocations;

a physical memory that is shared between the host processor and the at least one accelerator processor; and a security circuit configured to authorize client access to allocated regions of the physical memory based on whether a client identifier and a memory address from an intercepted memory translation corresponds to an authorized client with ownership and access rights to the memory address.

12. The system of claim 11, wherein the host processor is configured to execute a guest operating system that abstracts a virtual memory mapping one or more accelerator clients executed on the at least one accelerator processor to a corresponding allocated region of the physical memory, and the security circuit is further configured to communicate with the guest operating system to obtain the intercepted memory translation.

13. The system of claim 12, wherein the guest operating system implements an application container that manages execution of the one or more accelerator clients.

14. The system of claim 11, wherein the at least one accelerator processor comprises a plurality of accelerator processors that are each operable to execute on different accelerator clients.

15. The system of claim 11, wherein the security circuit includes a different corresponding interface to communicate with each client executed by the host processor and the at least one accelerator processor.

16. The system of claim 11, wherein the security circuit is configured to communicate with a memory controller of the physical memory to satisfy each memory translation when the intercepted memory translation corresponds to the authorized client, and communicates an error to a client sender of the intercepted memory translation when the intercepted memory translation does not correspond to the authorized client.

17. A method comprising:

maintaining, by a security processor, client permissions that authorize client ownership and access rights to allocated regions of a system memory; and authorizing, by the security processor, client access to the allocated regions of the system memory based on whether a client identifier and a memory address from an intercepted memory translation corresponds to an authorized client with ownership and access rights to the memory address.

18. The method of claim 17, further comprising:

establishing, by the security processor, the client permissions by responding to memory allocation requests received from a guest operating system executing on a host processor or an accelerator client executing on an accelerator processor to record at least one authorized client in the client permissions to each of the allocated regions.

19. The method of claim 17, further comprising:

outputting, by the security processor, a memory controller command that satisfies the intercepted memory translation in response to authorizing the client access.

20. The method of claim 17, further comprising:

communicating, by the security processor, an error to a client sender of the intercepted memory translation executing on a host processor or an accelerator processor in response to a failed authorization of the client access.

* * * * *